(12) United States Patent
Fang et al.

(10) Patent No.: US 9,470,961 B2
(45) Date of Patent: Oct. 18, 2016

(54) PROJECTION APPARATUS AND LIGHT SOURCE MODULE HAVING FIXING WIRE

(71) Applicants: Chen-Yuan Fang, Hsin-Chu (TW); Yung-Chuan Tseng, Hsin-Chu (TW)

(72) Inventors: Chen-Yuan Fang, Hsin-Chu (TW); Yung-Chuan Tseng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 93 days.

(21) Appl. No.: 14/513,233

(22) Filed: Oct. 14, 2014

(65) Prior Publication Data

US 2015/0192847 A1    Jul. 9, 2015

(30) Foreign Application Priority Data

Jan. 8, 2014    (CN) .......................... 2014 1 0008148

(51) Int. Cl.

| | |
|---|---|
| *G03B 21/20* | (2006.01) |
| *H05B 41/38* | (2006.01) |
| *H01J 61/82* | (2006.01) |
| *H01J 61/36* | (2006.01) |
| *H01J 61/50* | (2006.01) |
| *H01J 61/54* | (2006.01) |

(52) U.S. Cl.
CPC ....... *G03B 21/2026* (2013.01); *G03B 21/2053* (2013.01); *G03B 21/2086* (2013.01); *H01J 61/36* (2013.01); *H01J 61/50* (2013.01); *H01J 61/547* (2013.01); *H01J 61/822* (2013.01); *H05B 41/38* (2013.01)

(58) Field of Classification Search
CPC .......... G03B 21/2026; G03B 21/2053; H01J 61/36; H01J 61/547; H01J 61/822; H05B 41/38
See application file for complete search history.

(56) References Cited

U.S. PATENT DOCUMENTS

| 6,784,601 B2 * | 8/2004 | Kai ..................... F21V 29/004 313/18 |
| 2006/0033889 A1 * | 2/2006 | Terashima ............... H01J 5/50 353/85 |
| 2008/0117388 A1 | 5/2008 | Terashima et al. |
| 2011/0074273 A1 | 3/2011 | Kroell |

FOREIGN PATENT DOCUMENTS

| CN | 1721976 | 1/2006 |
| CN | 1788179 | 6/2006 |
| CN | 102971830 | 3/2013 |
| JP | 2011221482 | 11/2011 |
| JP | 2012089251 | 5/2012 |
| JP | 2013127871 | 6/2013 |
| TW | 200909986 | 3/2009 |

OTHER PUBLICATIONS

"Office Action of China Counterpart Application", issued on Mar. 3, 2016, p. 1-p. 8.

* cited by examiner

*Primary Examiner* — Sultan Chowdhury
*Assistant Examiner* — Magda Cruz
(74) *Attorney, Agent, or Firm* — Jianq Chyun IP Office

(57) ABSTRACT

A light source module and a projection apparatus including the light source module, a light valve, and a lens are provided. The light source module includes a cover, a light emitting device, a lead wire, a trigger wire, and at least one fixing wire. The light emitting device is partially disposed in the cover and includes a light source and a first pillar, wherein the light source is connected to the first pillar and provides an illumination beam. The lead wire is connected to the light source and is position-limited between the cover and the first pillar. The trigger wire is disposed on the first pillar and is electrically connected to the lead wire. The fixing wire is position-limited between the cover and the first pillar. One end of the fixing wire is connected to the first pillar, and another end of the fixing wire is position-limited to the cover.

20 Claims, 3 Drawing Sheets

PROJECTION APPARATUS AND LIGHT SOURCE MODULE HAVING FIXING WIRE

CROSS-REFERENCE TO RELATED APPLICATION

This application claims the priority benefit of China application serial no. 201410008148.X, filed on Jan. 8, 2014. The entirety of the above-mentioned patent application is hereby incorporated by reference herein and made a part of this specification.

BACKGROUND

1. Technical Field

The invention relates to an optical apparatus and a light source module thereof. Particularly, the invention relates to a projection apparatus and a light source module thereof.

2. Related Art

A projection apparatus is a display apparatus to generate images at anytime anywhere. An imaging principle of the projection apparatus is to convert an illumination beam generated by a light source module into an image beam through a light valve, and project the image beam onto a screen or a wall through a lens to form an image. Along with progress of projection technology and reduction of manufacturing cost, use of the projection apparatus has gradually expanded from commercial use to domestic use.

In some projection apparatuses, an ultra high-pressure mercury lamp is used as the light source module, and a light emitting device thereof is fixed in a lamp cover. However, when a bulb of the light emitting device cracks, a part of structure of the light emitting device is no longer fixed to the lamp cover and is only connected to a lead wire to swing outside the lamp cover along with swing of the lead wire. At that time, a trigger wire is easy to contact a conductive housing outside the lamp cover along with swing of the light emitting device to cause short circuit to damage a driving unit and a power supply unit. Techniques disclosed by U.S. Patent Publication No. 20080117388, U.S. Patent Publication No. 20110074273, and Taiwan Patent Publication No. 200909986 still do not resolve the aforementioned problem.

SUMMARY

The invention is directed to a projection apparatus, a trigger wire of a light source module of projection apparatus may not contact a conductive housing outside a cover to cause short circuit due to crack of a light source.

The invention is directed to a light source module, a trigger wire of the light source module may not contact a conductive housing outside a cover to cause short circuit due to crack of a light source.

Other objects and advantages of the invention can be further illustrated by the technical features broadly embodied and described as follows.

In order to achieve one or a portion of or all of the objects or other objects, an embodiment of the invention provides a projection apparatus including a light source module, a light valve, and a lens. The light source module includes a cover, a light emitting device, a lead wire, a trigger wire, and at least one fixing wire. The light emitting device is at least partially disposed in the cover and includes a light source and a first pillar, wherein the light source is connected to the first pillar and is configured to provide an illumination beam. The lead wire is electrically connected to the light source and is position-limited between the cover and the first pillar, wherein one end of the lead wire is connected to the first pillar, and another end of the lead wire is position-limited to the cover. The trigger wire is disposed on the first pillar and is electrically connected to the lead wire. The fixing wire is position-limited between the cover and the first pillar, wherein one end of the fixing wire is connected to the first pillar, and another end of the fixing wire is position-limited to the cover. The light valve is configured to convert the illumination beam into an image beam. The lens is configured to convert the image beam into a projection beam.

In order to achieve one or a portion of or all of the objects or other objects, an embodiment of the invention provides a light source module including a cover, a light emitting device, a lead wire, a trigger wire, and at least one fixing wire. The light emitting device is at least partially disposed in the cover and includes a light source and a first pillar, wherein the light source is connected to the first pillar. The lead wire is electrically connected to the light source and is position-limited between the cover and the first pillar, wherein one end of the lead wire is connected to the first pillar, and another end of the lead wire is position-limited to the cover. The trigger wire is disposed on the first pillar and is electrically connected to the lead wire. The fixing wire is position-limited between the cover and the first pillar, wherein one end of the fixing wire is connected to the first pillar, and another end of the fixing wire is position-limited to the cover.

According to the above descriptions, the embodiments of the invention have at least one of the following effects. In the embodiments of the invention, the first pillar of the light emitting device may be position-limited to the cover through the fixing wire besides being position-limited to the cover through the lead wire. In this way, when the light source of the light emitting device cracks to cause the first pillar to be no longer fixed to the cover, the first pillar is commonly pulled by the lead wire and the fixing wire without swinging outside the cover along with swing of the lead wire. In this way, the trigger wire on the first pillar is prevented from contacting the conductive housing outside the cover to cause short circuit, so as to avoid damaging a power supply unit electrically connected to the lead wire and the trigger wire.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
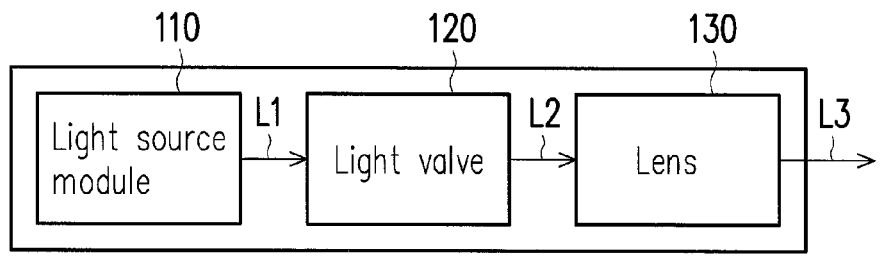
FIG. 1 is a schematic diagram of a projection apparatus according to an embodiment of the invention.

Referring to FIG. 1, the projection apparatus 100 of the embodiment includes a light source module 110, a light valve 120, and a lens 130. The light source module 110 is used for providing an illumination beam L1, the light valve 120 is used for converting the illumination beam L1 into an image beam L2, and the lens 130 is used for converting the image beam L2 into a projection beam L3. The light source module 110 of the embodiment is, for example, an ultra high-pressure mercury lamp, though the invention is not limited thereto, and a detailed structure thereof is described as follows.

Figure 2:
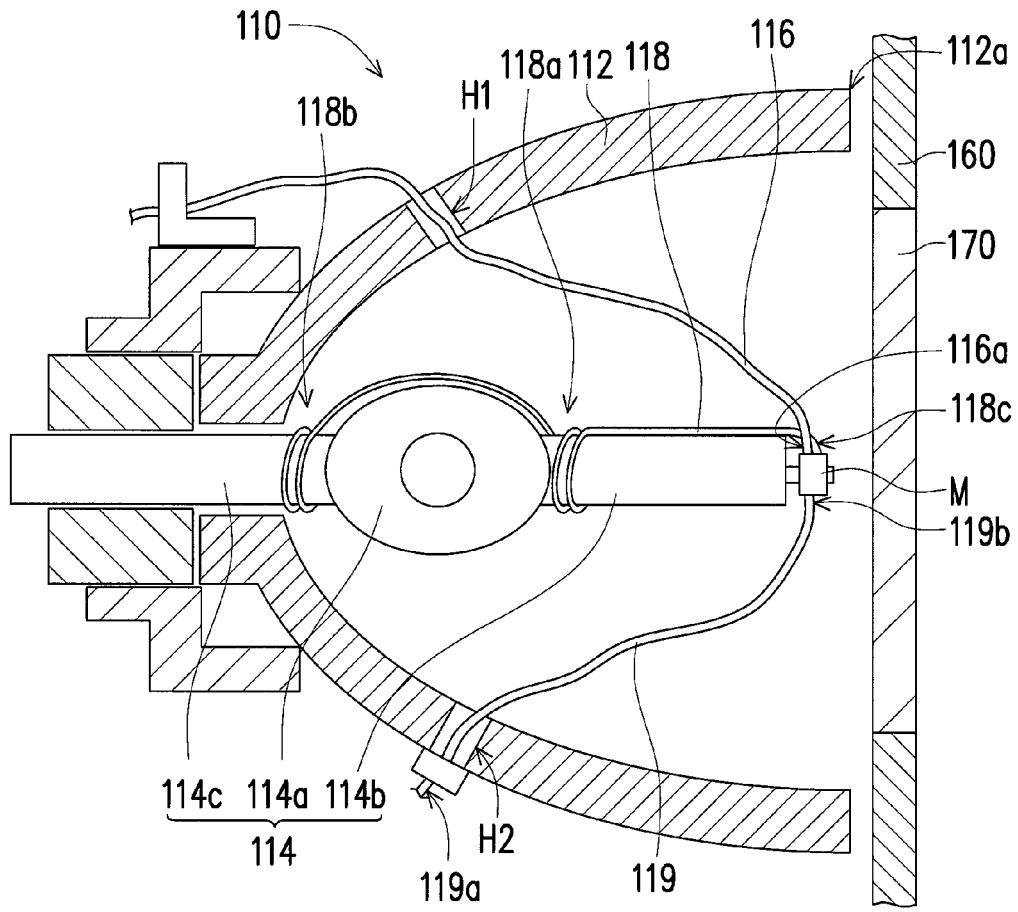
FIG. 2 is a partial cross-sectional view of the light source module of the projection apparatus of FIG. 1.

Referring to FIG. 2, the light source module 110 of the embodiment includes a cover 112, a light emitting device 114, a lead wire 116, a trigger wire 118, and a fixing wire 119. The cover 112 is, for example, a lamp cover of the ultra high-pressure mercury lamp. In the embodiment, the light emitting device 114 is at least partially disposed in the cover 112 and includes a light source 114a, a first pillar 114b, and a second pillar 114c. The second pillar 114c is fixed to the cover 112. The light source 114 is, for example, a lamp core of the ultra high-pressure mercury lamp, and is connected between the first pillar 114b and the second pillar 114c, and is used for generating the illumination beam L1 shown in FIG. 1.

Figure 3:
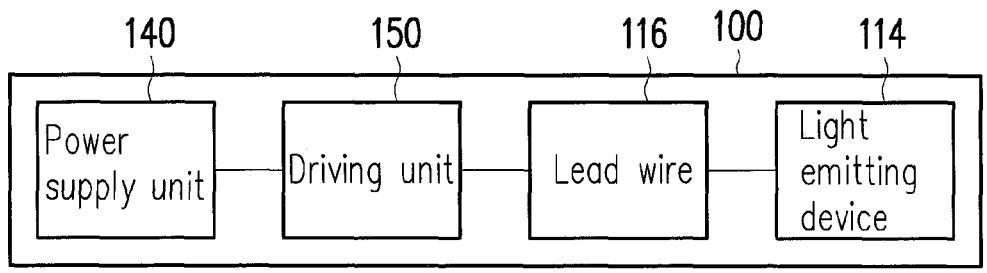
FIG. 3 is block diagram of a part of components of the projection apparatus of FIG. 1.

Referring to FIG. 2 and FIG. 3, the projection apparatus 100 of the embodiment further includes a power supply unit 140 and a driving unit 150. The lead wire 116 is electrically connected to the power supply unit 140, the driving unit 150, and the light source 114a, and the power supply unit 140 and the driving unit 150 supply power to the light emitting device 114 through the lead wire 116. Moreover, the lead wire 116 is position-limited between the cover 112 and the first pillar 114b. One end of the lead wire 116 is connected to the first pillar 114b, and another end of the lead wire 116 is position-limited to the cover 112. The lead wire 116 is electrically connected to the power supply unit 140 and the driving unit 150. The fixing wire 119 is position-limited between the cover 112 and the first pillar 114b, wherein one end of the fixing wire 119 is connected to the first pillar 114b, and another end of the fixing wire 119 is position-limited to the cover 112. The aforementioned position limitation refers to limitation of a moving space of the lead wire 116 or the fixing wire 119 penetrating through the cover 112, though the invention is not limited thereto. For example, the lead wire 116 may be fixed to an outer side of the cover 112 through welding, and is further connoted to another lead wire (for example, though welding) for electrically connecting the power supply unit 140 and the driving unit 150. Moreover, the trigger wire 118 is disposed on the first pillar 114b and the second pillar 114c and is electrically connected to the lead wire 116, wherein a part 118a of the trigger wire 118 may wrap around the first pillar 114b, and another part 118b of the trigger wire 118 may wrap around the second pillar 114c, so as to decrease a lighting voltage of the light source 114a.

Referring to FIG. 2, the projection apparatus 100 (shown in FIG. 1) of the embodiment includes a conductive housing 160 and a transparent plate 170. The conductive housing 160 is, for example, a metal casing, and the light source module 110 is disposed in the conductive housing 160. The cover 112 has an opening 112a, and a part of the conductive housing 160 is aligned to the opening 112a. The transparent plate 170 is disposed on the conductive housing 160 and is aligned to the opening 112a, such that the illumination beam L1 (shown in FIG. 1) emitted by the light emitting device 114 may emit out through the opening 112a and the transparent plate 170.

Under the above configuration, the first pillar 114b of the light emitting device 114 is further position-limited to the cover 112 through the fixing wire 119 besides being position-limited to the cover 112 through the lead wire 116. Therefore, when the light source 114a of the light emitting device 114 cracks as that shown in FIG. 4 due to excessive internal pressure, excessively high temperature or other factors to cause that the first pillar 114b is not fixed to the cover 112, the first pillar 114b is commonly pulled by the lead wire 116 and the fixing wire 119 without swinging outside the cover 112 along with swing of the lead wire 116. In this way, the trigger wire 118 on the first pillar 114b is prevented from contacting the conductive housing 160 outside the cover 112 to cause short circuit, so as to avoid damaging the power supply unit 160 and the driving unit 170 electrically connected to the lead wire 116 and the trigger wire 118. Moreover, based on the aforementioned configuration, the first pillar 114b is prevented from swinging outside the cover 112 to impact the transparent plate 170 when the light source 114a cracks, so as to avoid damaging the transparent plate 170.

Figure 5:
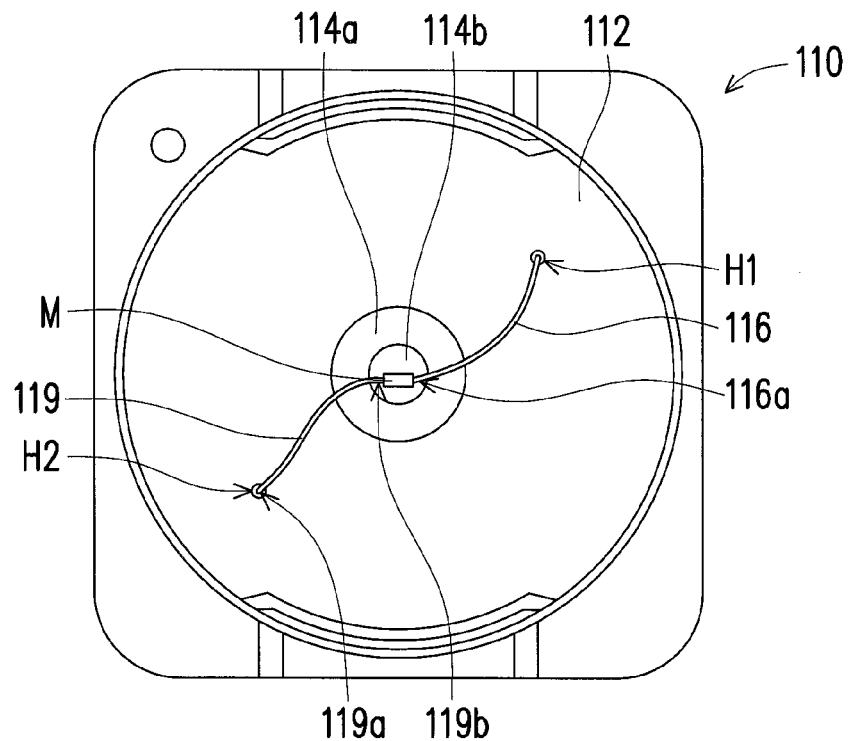
FIG. 5 is a front view of a light source module of FIG. 2.

In order to clarify the explanation the figure, the trigger wire 118 of FIG. 2 is not illustrated in FIG. 5. Referring to FIG. 2 and FIG. 5, in detail, the cover 112 of the embodiment has a hole H1 and a hole H2, and the lead wire 116 penetrates through the hole H1 of the cover 112 to be position-limited to the cover 112, and is electrically connected to the power supply unit 140 and the driving unit 150, wherein an end 116a of the lead wire 116 is clamped to a metal element M at an end of the first pillar 114b. An end 119a of the fixing wire 119 penetrates through the hole H2 of the cover 112 to be position-limited to the cover 112, and another end 119b of the fixing wire 119 is clamped to the metal element M at the end of the first pillar 114b. In the embodiment, the end 119a of the fixing wire 119 is, for example, fixed to the outer side of the cover 112 through riveting or other proper methods, which is not limited by the invention. Moreover, as shown in FIG. 2, an end 118c of the trigger wire 118 may also be clamped to the metal element M at the end of the first pillar 114b.

In the embodiment, a material of the fixing wire 119 is, for example, metal, such that the fixing wire 119 has enough structural strength and is not easy to be broken. Moreover, the material of the fixing wire 119 is, for example, the same as the metal material of the lead wire 116, so that a strength of the lead wire 116 pulling the first pillar 114b and the trigger wire 118 is, for example, the same as a strength of the fixing wire 119 pulling the first pillar 114b and the trigger wire 118 when the light source 114a cracks shown in FIG. 4. However, in other embodiments, the fixing wire 119 may be other suitable materials, which is not limited by the invention.

Figure 4:
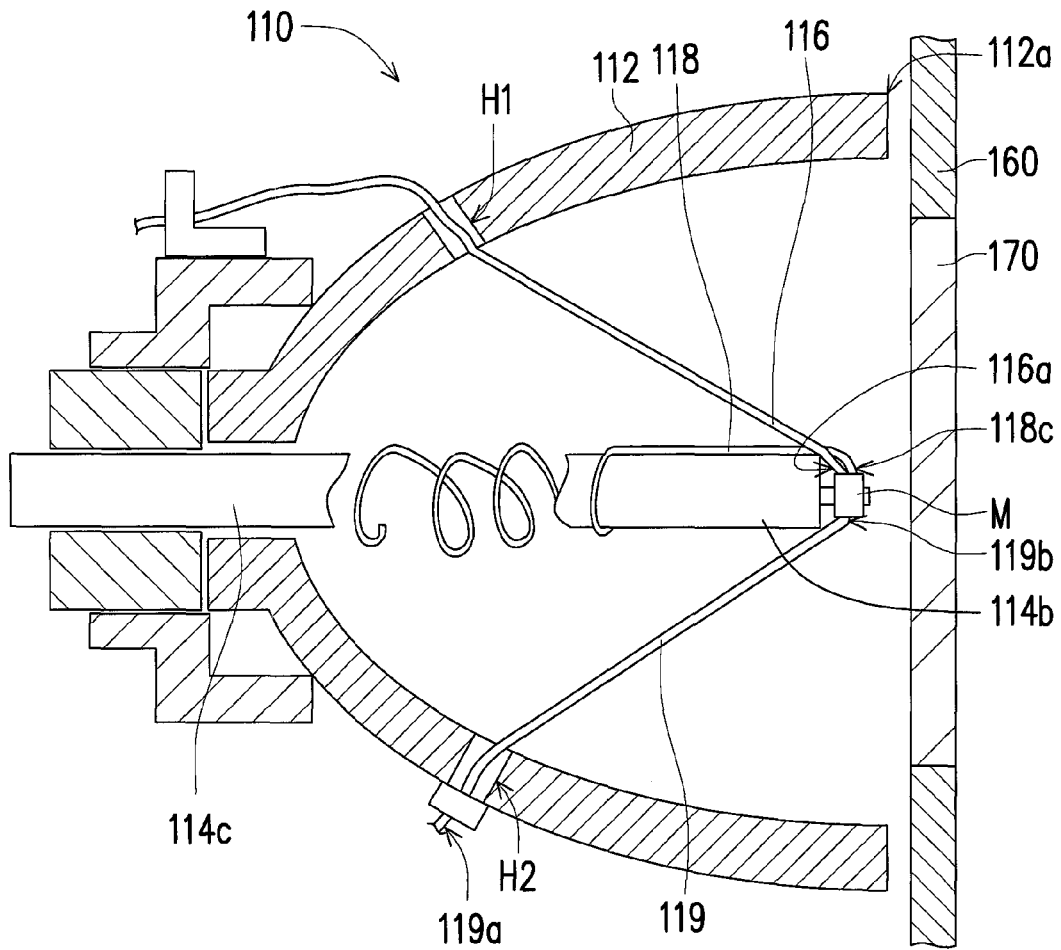
FIG. 4 is a schematic diagram illustrating crack of a light source of FIG. 2.

As shown in FIG. 5, the lead wire 116 and the fixing wire 119 of the embodiment are, for example, respectively located at two opposite sides of the first pillar 114b, accordingly the first pillar 114b and the trigger wire 118 may be indeed pulled by the lead wire 116 and the fixing wire 119 without swinging out of the cover 112 when the light source 114a cracks shown in FIG. 4. In other embodiments, more fixing wires may be configured within the cover, which is described below with reference of a figure.

Figure 6:
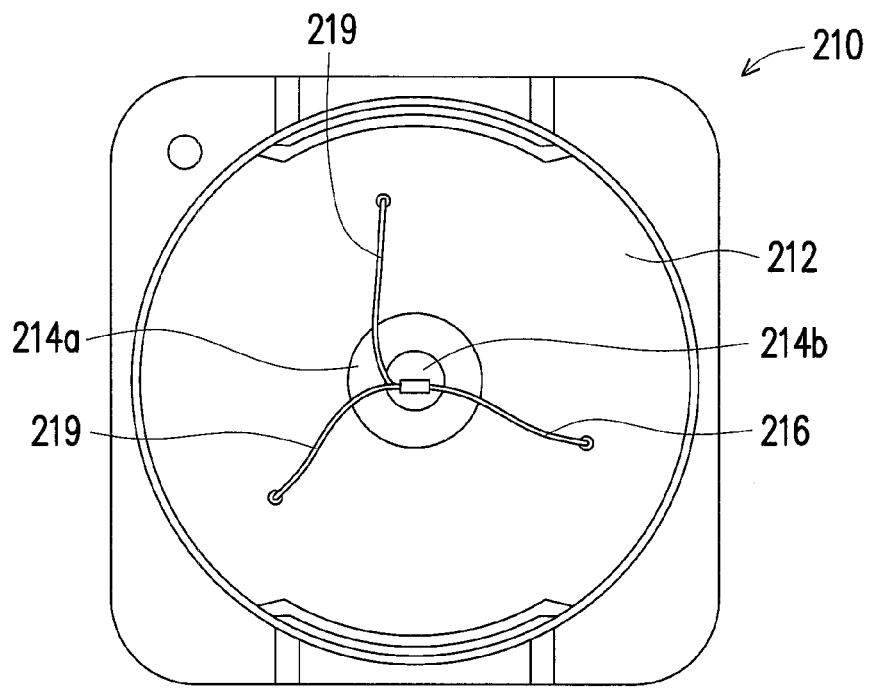
FIG. 6 is a front view of a light source module according to another embodiment of the invention.

In order to clarify the explanation the figure, the trigger wire on a first pillar 214b is not illustrated in FIG. 6. In the light source module 210 of FIG. 6, configurations and functions of a cover 212, a light source 214a, the first pillar 214b, and a lead wire 216 are similar to those of the cover 112, the light source 114a, the first pillar 114b, and the lead wire 116 of FIG. 5, and details thereof are not repeated. A main difference between the light source module 210 and the light source module 110 is that the number of fixing wires 219 is plural (for example, two), and the lead wire 216 and the fixing wires 219 are distributed around the first pillar 214b. In this way, when the light source 214a cracks, the first pillar 214b and the trigger wire located on the first pillar 214b may be indeed pulled by the lead wire 216 and the fixing wires 219 without swinging out of the cover 212. In other embodiments, the number of the fixing wires 219 may be other suitable values, which is not limited by the invention.

Moreover, taking the front view of the light source module as an example, referring to FIG. 5 and FIG. 6, the lead wire 216 and the fixing wires 219 are evenly distributed around the first pillar 214b. In detail, included angles formed by a connection line with the shortest distance between the hole H1 corresponding to the lead wire 116 and the metal element M at the end of the first pillar 114b and a connection line with the shortest distance between the hole H2 corresponding to the fixing wire 119 and the metal element M at the end of the first pillar 114b are the same substantially. For example, in FIG. 5, the included angles formed by the connection line with the shortest distance between the hole H1 corresponding to the lead wire 116 and the metal element M at the end of the first pillar 114b and the connection line with the shortest distance between the hole H2 corresponding to the fixing wire 119 and the metal element M at the end of the first pillar 114b are substantially 180 degrees. In FIG. 6, the included angles formed by the lead wire 216 and the fixing wires 219 (i.e. two included angles formed by the lead wire 216 and the fixing wire 219 and the included angle formed by the neighboring fixing wires 219) are respectively 120 degrees substantially, though the invention is not limited thereto. Based on such symmetric design, the pulling forces are balanced, so that the first pillar is effectively controlled without swinging outside the cover along with swing of the lead wire when the light source cracks.

In summary, the embodiments of the invention have at least one of the following effects. In the embodiments of the invention, the first pillar of the light emitting device may be position-limited to the cover through the fixing wire besides being position-limited to the cover through the lead wire. In this way, when the light source of the light emitting device cracks to cause the first pillar to be no longer fixed to the cover, the first pillar is commonly pulled by the lead wire and the fixing wire without swinging outside the cover along with swing of the lead wire. In this way, the trigger wire on the first pillar is prevented from contacting the conductive housing outside the cover to cause short circuit, so as to avoid damaging the power supply unit electrically connected to the lead wire and the trigger wire. Moreover, in the embodiment of the invention, based on the aforementioned configuration, the first pillar is prevented from swinging outside the cover to impact the transparent plate when the light source cracks, so as to avoid damaging the transparent plate.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   a light source module, comprising:
      a cover;
      a light emitting device, at least partially disposed in the cover, and comprising a light source and a first pillar, wherein the light source is connected to the first pillar and is configured to provide an illumination beam;
      a lead wire, electrically connected to the light source, and position-limited between the cover and the first pillar, wherein one end of the lead wire is connected to the first pillar, and another end of the lead wire is position-limited to the cover;
      a trigger wire, disposed on the first pillar, and electrically connected to the lead wire; and
      at least one fixing wire, position-limited between the cover and the first pillar, wherein one end of the at least one fixing wire is connected to the first pillar, another end of the at least one fixing wire is position-limited to the cover, and the first pillar is connected between the at least one fixing wire and the lead wire;
   a light valve, configured to convert the illumination beam into an image beam; and
   a lens, configured to convert the image beam into a projection beam.

2. The projection apparatus as claimed in claim 1, wherein a part of the trigger wire wraps around the first pillar.

3. The projection apparatus as claimed in claim 2, wherein the light emitting device further comprises a second pillar, the second pillar is fixed to the cover, the light source is connected between the first pillar and the second pillar, and another part of the trigger wire wraps around the second pillar.

4. The projection apparatus as claimed in claim 1, further comprising a power supply unit, wherein the lead wire is electrically connected to the power supply unit, and the power supply unit supplies power to the light emitting device through the lead wire.

5. The projection apparatus as claimed in claim 1, wherein a number of the at least one fixing wire is one, and the lead wire and the fixing wire are respectively located at two opposite sides of the first pillar.

6. The projection apparatus as claimed in claim 1, wherein a number of the at least one fixing wire is plural, and the lead wire and the fixing wires are distributed around the first pillar.

7. The projection apparatus as claimed in claim 1, wherein the cover has at least two holes, and the lead wire and the fixing wire respectively penetrate through the two holes for being position-limited to the cover.

8. The projection apparatus as claimed in claim 1, wherein a material of the fixing wire is the same as a material of the lead wire.

9. The projection apparatus as claimed in claim 1, further comprising a conductive housing, wherein the light source module is disposed in the conductive housing, the cover has an opening, and a part of the conductive housing is aligned to the opening.

10. The projection apparatus as claimed in claim 9, further comprising a transparent plate, wherein the transparent plate is disposed on the conductive housing and is aligned to the opening.

11. A light source module, comprising:
    a cover;
    a light emitting device, at least partially disposed in the cover, and comprising a light source and a first pillar, wherein the light source is connected to the first pillar;
    a lead wire, electrically connected to the light source, and position-limited between the cover and the first pillar, wherein one end of the lead wire is connected to the first pillar, and another end of the lead wire is position-limited to the cover;
    a trigger wire, disposed on the first pillar, and electrically connected to the lead wire; and
    at least one fixing wire, position-limited between the cover and the first pillar, wherein one end of the at least one fixing wire is connected to the first pillar, another end of the at least one fixing wire is position-limited to the cover, and the first pillar is connected between the at least one fixing wire and the lead wire.

12. The light source module as claimed in claim 11, wherein a part of the trigger wire wraps around the first pillar.

13. The light source module as claimed in claim 12, wherein the light emitting device further comprises a second pillar, the second pillar is fixed to the cover, the light source is connected between the first pillar and the second pillar, and another part of the trigger wire wraps around the second pillar.

14. The light source module as claimed in claim 11, adapted to a projection apparatus, wherein the lead wire is electrically connected to a power supply unit of the projection apparatus, and the power supply unit supplies power to the light emitting device through the lead wire.

15. The light source module as claimed in claim 11, wherein a number of the at least one fixing wire is one, and the lead wire and the fixing wire are respectively located at two opposite sides of the first pillar.

16. The light source module as claimed in claim 11, wherein a number of the at least one fixing wire is plural, and the lead wire and the fixing wires are distributed around the first pillar.

17. The light source module as claimed in claim 11, wherein the cover has at least two holes, and the lead wire and the fixing wire respectively penetrate through the two holes for being position-limited to the cover.

18. The light source module as claimed in claim 11, wherein a material of the fixing wire is the same as a material of the lead wire.

19. The light source module as claimed in claim 11, adapted to a projection apparatus, wherein the light source module is disposed in a conductive housing of the projection apparatus, the cover has an opening, and a part of the conductive housing is aligned to the opening.

20. The light source module as claimed in claim 19, wherein a transparent plate of the projection apparatus is disposed on the conductive housing and is aligned to the opening.

* * * * *